(12) United States Patent
Weber

(10) Patent No.: US 9,234,372 B2
(45) Date of Patent: Jan. 12, 2016

(54) ARTICLE SECURITY SYSTEMS AND DEVICES

(76) Inventor: Paul Joseph Weber, Christchurch (NZ)

( * ) Notice: Subject to any disclaimer, the term of this patent is extended or adjusted under 35 U.S.C. 154(b) by 1151 days.

(21) Appl. No.: 12/908,735

(22) Filed: Oct. 20, 2010

(65) Prior Publication Data

US 2011/0031293 A1 Feb. 10, 2011

Related U.S. Application Data

(63) Continuation-in-part of application No. 12/867,919, filed as application No. PCT/NZ2009/000084 on May 28, 2009.

(51) Int. Cl.
| | |
|---|---|
| *F16M 13/00* | (2006.01) |
| *E05B 73/00* | (2006.01) |
| *B60R 11/02* | (2006.01) |
| *E05B 67/38* | (2006.01) |
| *B60R 11/00* | (2006.01) |

(52) U.S. Cl.
CPC ............. *E05B 73/0082* (2013.01); *B60R 11/02* (2013.01); *E05B 67/383* (2013.01); *B60R 11/0252* (2013.01); *B60R 2011/0096* (2013.01); *Y10T 70/5009* (2015.04)

(58) Field of Classification Search
CPC .. E05B 73/0082; E05B 67/003; E05B 67/383
USPC .......... 70/69, 19, 57, 57.1, 58, 59, 61, 62, 63; 248/550, 551, 552, 553, 505, 220.21, 248/220.22, 223.41, 220.41, 220.42, 248/221.11, 500, 346.5, 670, 256, 261, 265, 248/298.1, 423, 429; 361/679.57, 726, 732, 361/747
See application file for complete search history.

(56) References Cited

U.S. PATENT DOCUMENTS

| | | | |
|---|---|---|---|
| 3,460,791 A * | 8/1969 | Judd | 248/188.91 |
| 3,945,227 A * | 3/1976 | Reiland | 70/58 |
| 4,155,079 A | 5/1979 | Chiu et al. | |
| 4,696,449 A | 9/1987 | Woo et al. | |
| 4,985,695 A | 1/1991 | Wilkinson et al. | |
| 5,051,725 A | 9/1991 | Caccitolo | |
| 5,052,199 A | 10/1991 | Derman | |
| 5,076,079 A | 12/1991 | Monoson et al. | |
| 5,714,933 A | 2/1998 | Le Van Suu | |
| 5,742,475 A | 4/1998 | Riddiford | |
| 5,748,083 A | 5/1998 | Rietkerk | |
| 5,836,183 A | 11/1998 | Derman | |
| 6,125,669 A | 10/2000 | McDaid et al. | |
| 6,192,722 B1 | 2/2001 | Galant | |
| 6,212,921 B1 | 4/2001 | Knighton | |
| 6,216,499 B1 | 4/2001 | Ronberg et al. | |
| 6,237,375 B1 | 5/2001 | Wymer | |
| 6,402,111 B1 * | 6/2002 | Stewart et al. | 248/317 |
| 6,443,417 B2 | 9/2002 | Galant | |
| 6,454,234 B1 * | 9/2002 | Westbrook | 248/317 |

(Continued)

*Primary Examiner* — Kimberly Wood
(74) *Attorney, Agent, or Firm* — Phillips Ryther & Winchester; Matthew D. Thayne

(57) ABSTRACT

Disclosed are embodiments of apparatus, methods, and systems for securing articles, such as electronic articles (for example, laptop computers and the like) for theft deterrence or prevention. In some embodiments, theft deterrence is provided by securing the article(s) to an object that makes the task of removing the article more difficult for a would-be thief. Locking the article into the system or device often inhibits access to various fastening devices to further deter/prevent theft.

18 Claims, 9 Drawing Sheets

(56) References Cited

U.S. PATENT DOCUMENTS

| | | |
|---|---|---|
| 6,654,890 B1 | 11/2003 | Girard |
| 7,305,714 B2 | 12/2007 | Hamaguchi et al. |
| 7,324,333 B2 | 1/2008 | Allen |
| 7,362,227 B2 | 4/2008 | Kim |
| 2009/0108162 A1* | 4/2009 | Hatton ................ 248/311.2 |

* cited by examiner

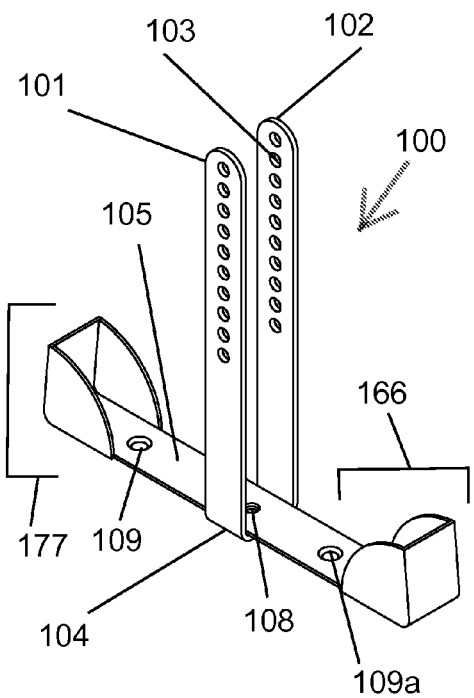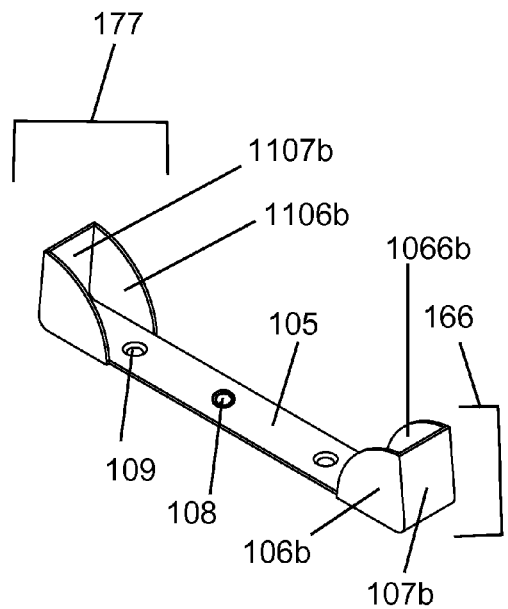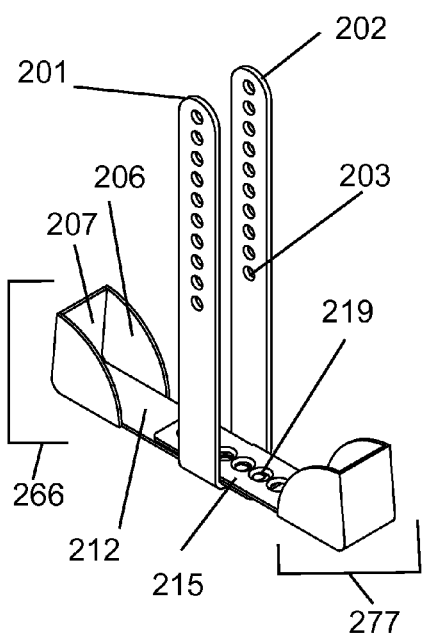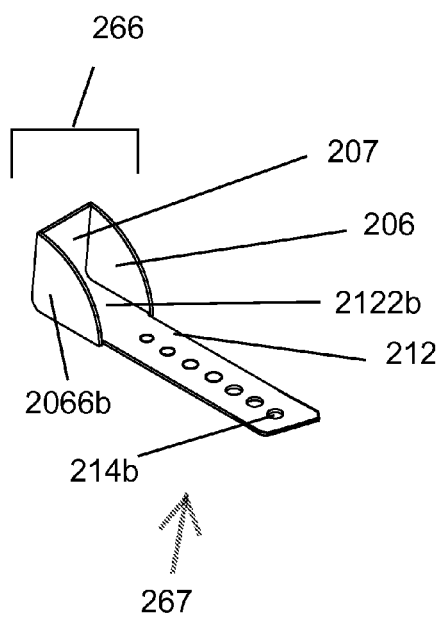
FIG. 1a
FIG. 1b
FIG. 2a
FIG. 2b

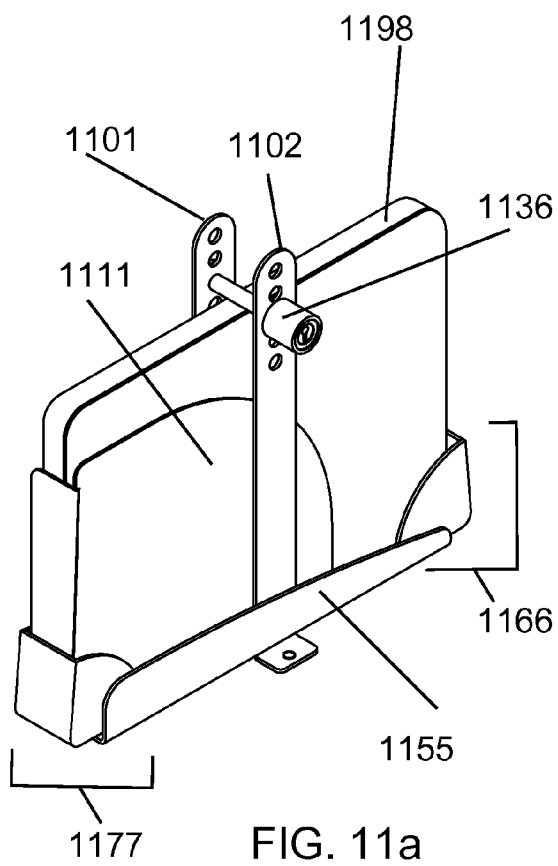
FIG. 11a
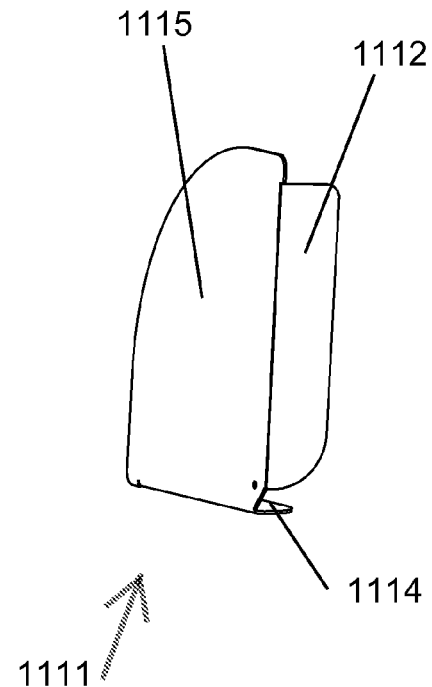
FIG. 11b
FIG. 11c
FIG. 12
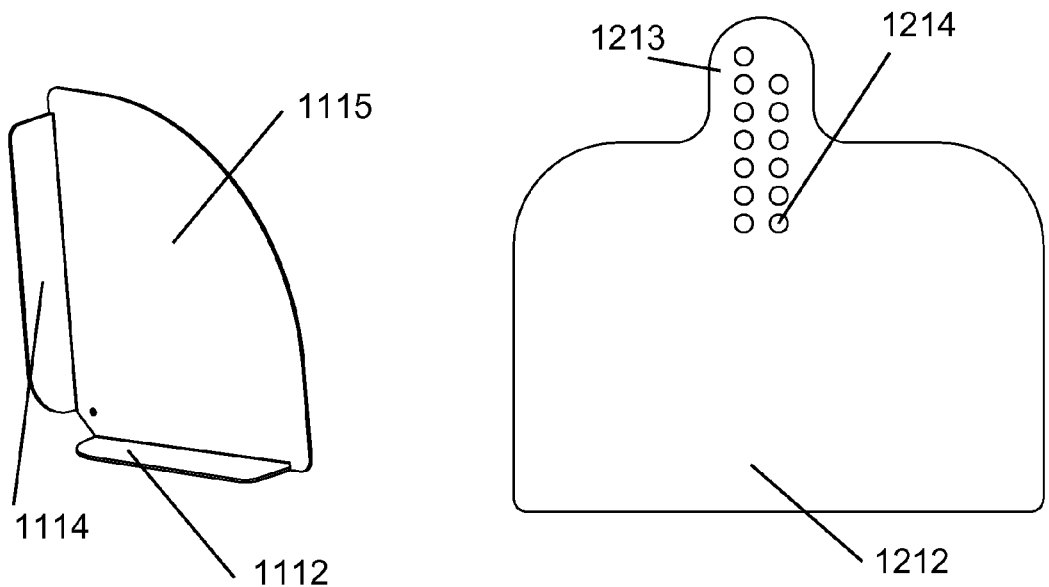

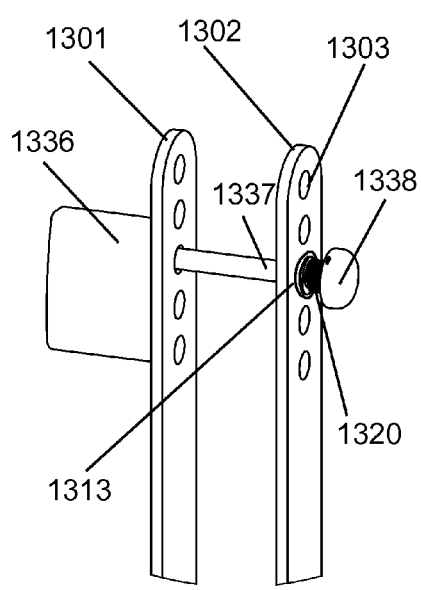
FIG. 13a
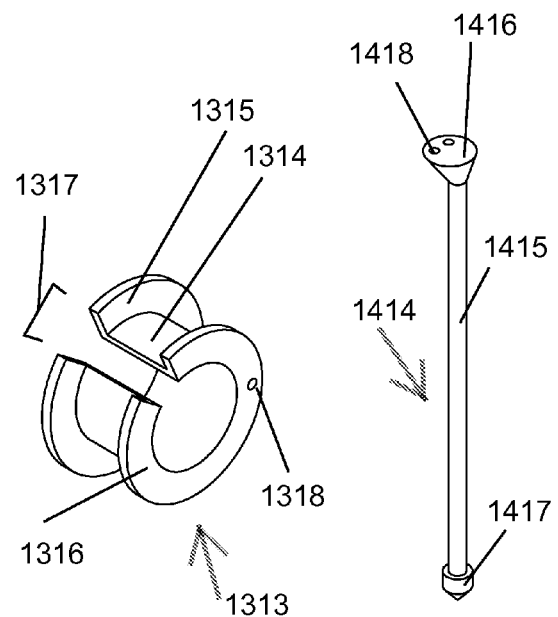
FIG. 13b
FIG. 14
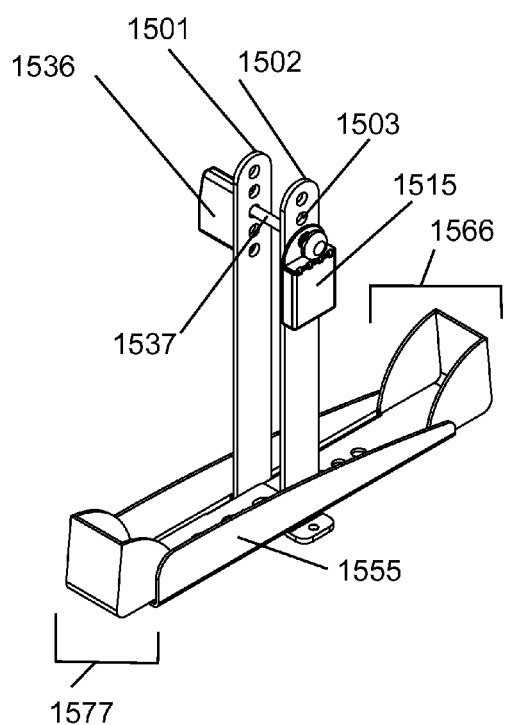
FIG. 15a
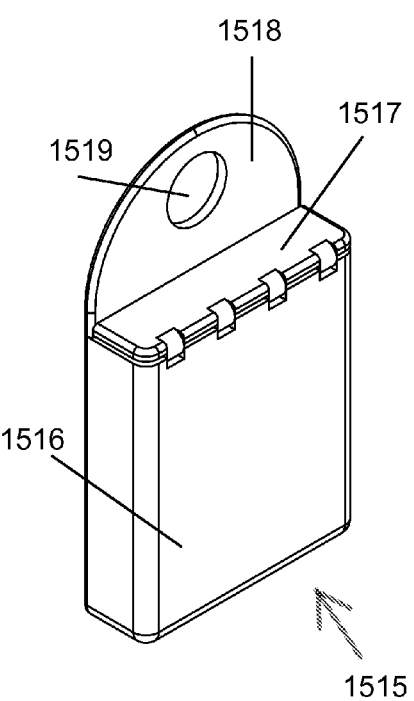
FIG. 15b

ARTICLE SECURITY SYSTEMS AND DEVICES

RELATED APPLICATIONS

This application is a continuation-in-part of pending U.S. patent application Ser. No. 12/867,919, filed on Aug. 17, 2010, which is a National Stage Entry of International Application No. PCT/NZ09/00084, filed on May 28, 2009, each of which are hereby incorporated by reference.

BRIEF DESCRIPTION OF THE DRAWINGS

It is to be understood that the drawings depict only certain preferred embodiments of the invention and are therefore not to be considered limiting of its scope; the preferred embodiments will be described and explained with additional specificity and detail through the use of the accompanying drawings in which:

FIG. 1a is a perspective view of an embodiment of a security device with a U-shaped siderail and unitary end brackets.

FIG. 1b is a perspective view of the unitary end bracket previously depicted in FIG. 1a.

FIG. 2a is a perspective view of an embodiment with a U-shaped siderail and two adjustable end brackets.

FIG. 2b is a perspective view of the longer adjustable end bracket of the two previously depicted in FIG. 2a.

FIG. 2c is a perspective view of the opposing shorter adjustable end bracket previously depicted in FIG. 2a.

FIG. 3b is a perspective view of the individual 'L' shaped siderail depicted in FIG. 3a.

FIG. 3c is a perspective view of the coupling member depicted in FIG. 3a.

FIG. 5b is a perspective view of the pivotable siderails coupled via the joining member shown in FIG. 5a.

FIG. 9b is a perspective view of the angle adapter shown in FIG. 9a.

FIG. 10b is a perspective view of the embodiment of the angle adapter of FIG. 10a.

FIG. 11a is a perspective view of an embodiment of a security system or device including a component protection adapter configured for use with various embodiments of security devices disclosed herein. The depicted embodiment comprises a component adapter and a laptop contained within siderails, end brackets, and a basal adapter.

FIG. 11b is a perspective view of (a mirror image) of the component protection adapter shown in FIG. 11a.

FIG. 11c is a perspective view of the component protection adapter shown in FIG. 11a.

FIG. 12 is a perspective view of an embodiment of a substantially planar type of component protection adapter.

FIG. 13a is a perspective view of an embodiment of a security system or device including a lock hole insert adapter configured for use with various embodiments of security devices disclosed herein.

FIG. 13b is a perspective view of the insert shown in FIG. 13a.

FIG. 14 is a perspective view of a ground adapter configured for use with various embodiments of security devices disclosed herein.

FIG. 15a is a perspective view of an embodiment of a security system or device including an auxiliary security container adapter configured for use with various embodiments of security devices disclosed herein.

FIG. 15b is a perspective view of the auxiliary security container adapter shown in FIG. 15a.

DETAILED DESCRIPTION OF PREFERRED EMBODIMENTS

Figure 2C:
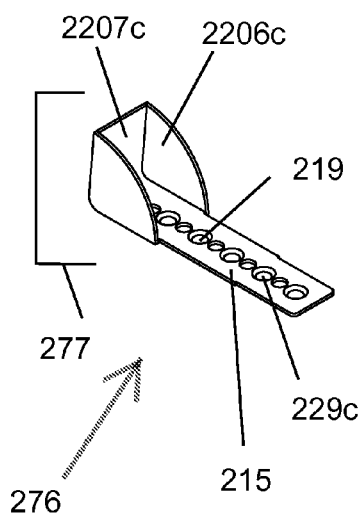

Disclosed herein are embodiments of apparatus, methods, and systems for securing articles, such as electronic articles (for example, laptop computers and the like) for theft deterrence or prevention. In some embodiments, theft deterrence is provided by securing the article(s) to an object that makes the task of removing the article more difficult for a would-be thief. Locking the article into the system or device often inhibits access to various fastening devices to further deter/prevent theft.

Although many of the embodiments described herein are described as being used to secure laptops or other electronic articles, in some embodiments, the security system may be configured to secure briefcases or other non-electronic articles, in addition to or as an alternative to electronic articles. It should be understood that any references herein to a personal computer, laptop computer, or other specific electronic article, may be considered to apply, unless otherwise specified, to any other electronic article, such as a stereo system, gaming console, etc., or to any other non-electronic article.

The combination of siderails 101 and 102 and end brackets may be used to secure an electronic article, as shown in the security device 100 of FIG. 1a. In one embodiment of the security device 100, the siderails 101 and 102 may be fused or otherwise connected at their bases 104, thus forming a U-shape wherein the sides of the U contain one or more siderail lock holes 103 which may accommodate a locking mechanism. In some embodiments, both siderails may be part of one unitary piece of material. The presence of a locking mechanism maintains the location of the rigid article between the siderails and the end brackets (torque inhibition rails). One or more holes 108 and/or 109 and/or 109a in the base portion of an end bracket may be aligned with one or more holes in the U-shaped siderail and/or a hole in an opposing end bracket to allow passage of a fastener. Such fasteners may include but are not limited to bolts, mechanical anchors, screws, nails, and rivets. Mechanical anchors may include but are not limited to the interference fit types, thread forming types, and expansion types.

Siderails may be continuous, forming a generally or substantially U-shape, or may be in the shape of an 'L' or a straight rail. In some embodiments, the siderail may include a geometric formation on at least one end so as to inhibit movement of the siderail. For example, in some embodiments, the geometric formation may prevent the siderail from being removed from the device or passed through a portion of a component of the device. One or both of the siderails may contain slots or holes that may adjustably align with one another. In an embodiment, one or more U-shaped siderails 101, 102 are rounded at the apical or distal ends for aesthetic and safety considerations. One or more siderail lock holes 103 in the siderails may receive a portion of a locking mechanism which may include a padlock or single shaft lock, such as a trailer lock. One or more bottom holes, which may be configured to be aligned with fastener opening/hole 108 to allow a fastener to extend through both openings, may be provided in the U-shaped siderails (not visible in FIG. 1a or 1b) to allow for passage of one or more fasteners. Siderails may be comprised of metal, mineral, carbon, plastic or organic chemical materials; metals may include but not be limited to spring steel and alloys; minerals may include but not be limited to basalt fiber. In one embodiment, the siderails measure 5 mm thick, 350 mm along the major axis, 40 mm on the minor axis (perpendicular to the major axis), and have a bent portion measuring 50 mm across. In some embodiments, end brackets containing one or more holes 108, 109a and 109b in the base portion 105 may terminate in buckets 166 and 177. In some embodiments, an intermediary binding structure may be provided to unite the siderails and/or end brackets. In some embodiments, siderails may measure 5 mm thick, 370 mm along the (major) long axis and 40 mm width in the minor axis (perpendicular to the major axis); the bent portion of the siderails may measure 40×55 mm on its inner dimension. In some embodiments: the thickness may vary from 0.1 mm to 10 cm thick; the (major) long axis may vary from 1 mm to 2000 cm; the width in the minor axis (perpendicular to the major axis) may vary from 1 mm to 1000 cm; bottom 'U' segments may vary from 1 mm to 1000 cm in length and width.

In an embodiment depicted in FIG. 1b, bucket 166 may be comprised of gussets 106b and 1066b and/or end portion 107b. Bucket 177 may be comprised of gussets 1106b and an opposing gusset and/or end portion 1107b. The end bracket may be made with one or more gussets. In the embodiment shown in FIG. 1b, opposing gussets 106b and 1066b are provided at or near an end of the end bracket; one end of the gusset is attached to the end portion 107b and the other end of the gusset is attached to the base portion 105 of the end bracket. The gussets are present to prevent a would-be-thief from manipulating an article to remove it from the security device. Alternatives to the shape and size include extending the gussets further along the base portion or end portion to accommodate a variety of different sized and/or shaped articles. In some embodiments, the end portion 107b may form an angle from the base portion 105 of approximately 20 to 160 degrees (in some of those embodiments the range may be 40 to 120 degrees). In some of those embodiments, an 85 degree angle may be used to meet the edge of a tilted article such as a laptop. In some embodiments, the end portion of the end bracket comprises a substantially verticalized portion. In some embodiments, end brackets may be comprised of two separate adjustable brackets or be in the form of a unitary structure such as is shown in FIGS. 1a and 1b. In some embodiments, the end brackets may pass over, under or through the siderails and/or an intermediary binding structure, such as the coupling member shown in FIGS. 3a and 3c. In some embodiments, at least one hole, for example, 108, and/or 109 in base portion 105 may be countersunk to capacitate at least one head of a countersunk fastener. In some embodiments, one or more end bracket base portion holes may be aligned with one or more siderail holes and/or coupling member holes and/or basal adapter holes to allow passage of a fastener. In some embodiments, padding including but not limited to plastic or rubber may be included to modify contact between an article and a fastener or portion of the device or system. End brackets may be comprised of metal, mineral, carbon, plastic or organic chemical materials; metals may include but not be limited to spring steel and alloys; minerals may include but not be limited to basalt fiber. In some embodiments, end brackets comprise gussets. In some embodiments, end brackets comprise a base portion. In some embodiments, end brackets comprise an end portion. In some embodiments, end brackets comprise gussets and an end portion. In some embodiments, end brackets comprise gussets and a base portion. In some embodiments, end brackets comprise an end portion and a base portion. In some embodiments, end brackets comprise gussets and an end portion and a base portion. In some embodiments, end brackets may be configured to preclude a would-be-thief from twisting an article. In some embodiments, end brackets may be configured to prevent a would-be-thief from sliding the laptop out of the device. In some embodiments, end brackets may prevent a would-be-thief from twisting an article to allow it to pass by the end portion of the end brackets. In some embodiments, end brackets may inhibit access to a hard drive. In some embodiments, end brackets, in the presence of an article, inhibit access to a fastener. In some embodiments, the unitary end bracket base portion may measure 3 mm thick, 400 mm along the (major) long axis and 50 mm wide in the minor axis (perpendicular to the major axis); buckets may measure 56 mm wide with an end portion measuring 75 mm. In some embodiments, the thickness of these items may vary from 0.1 mm to 10 cm thick; the (major) long axis may vary from 1 mm to 2000 cm; the width in the minor axis (perpendicular to the major axis) may vary from 1 mm to 1000 cm; buckets may vary from 1 mm to 1000 cm wide; and the end portion may vary from 1 mm to 1000 cm. Buckets 166 and 177 define a length of an article confinement region and siderails 101 and 102 define a width of the article confinement region.

In some embodiments, for example, FIG. 2a, end brackets may be comprised of two separate adjustable brackets. In one embodiment, the siderails 201 and 202 may be fused or otherwise connected at their bases thus forming a U-shape wherein the sides of the U contain one or more siderail lock holes 203 which may accommodate a locking mechanism. In some embodiments, both siderails may be part of one unitary piece of material. The presence of a locking mechanism maintains the location of the rigid article between the siderails and the end brackets (torque inhibition rails). One or more holes 219 in the base portion 215 of an end bracket may be aligned with one or more holes in the U-shaped siderail and/or a hole in an opposing end bracket to allow passage of a fastener. Such fasteners may include but are not limited to bolts, mechanical anchors, wood screws, nails, and rivets. Siderails may be continuous, forming a generally or substantially U-shape, or may be in the shape of an 'L' or a straight rail. In some embodiments, the siderail may include a geometric formation on at least one end so as to inhibit movement of the siderail. For example, in some embodiments, the geometric formation may prevent the siderail from being removed from the device or passed through a portion of a component of the device. One or both of the siderails may contain slots or siderail lock holes that may adjustably align with one another. One or more basal holes may be provided in the U-shaped siderails to allow for passage of one or more fasteners. In some embodiments, end brackets containing one or more holes 219 in the base portion 215 may terminate in buckets 277 with an end portion and gussets. In some embodiments, an intermediary binding structure may be provided to unite the siderails and/or end brackets.

In an embodiment depicted in FIG. 2b, the lower end bracket 267 is comprised of base portion 212 (with one or more holes 214b) and bucket 266; bucket 266 may be comprised of gussets 206 and 2066b and end bracket end portion 207 and the part of the end bracket base portion 2122b continuing into bucket 266.

In an embodiment depicted in FIG. 2c, the upper end bracket 276 is comprised of base portion 215 and bucket 277; bucket 277 may be comprised of gussets 2206c and an opposing gusset and/or an end portion 2207c and a part of end bracket base portion 215. The end bracket may be made with one or more gussets. Alternatives to the shape and size include extending the gussets further along the base portion or end portion to accommodate a variety of different sized and/or shaped articles. In some embodiments, the end portion 2207c may form an angle from the base portion 215 of approximately 20 to 160 degrees (in some of those embodiments the range may be 40 to 120 degrees). In some of those embodiments, an 85 degree angle may be used to meet the edge of a tilted article such as a laptop. In some embodiments, the end portion of the end bracket comprises a substantially verticalized portion. In some embodiments, the end brackets may pass over, under or through the siderails and/or an intermediary binding structure and/or coupling member. In some embodiments one or more end bracket base portion holes 219 and 229c may be aligned with one or more siderail holes and/or coupling member holes and/or basal adapter holes to allow passage of a fastener. In some embodiments, padding including but not limited to plastic or rubber may be included to modify contact between an article and a fastener or portion of the device or system. In some embodiments, end bracket base may measure 3 mm thick, 250 mm along the (major) long axis and 50 mm wide in the minor axis (perpendicular to the major axis); buckets may measure 56 mm wide with an end portion measuring 75 mm high. In some embodiments, the thickness of the end brackets may vary from 0.1 mm to 10 cm thick; the (major) long axis may vary from 1 mm to 2000 cm; the width in the minor axis (perpendicular to the major axis) may vary from 1 mm to 1000 cm; buckets may vary from 1 mm to 1000 cm wide; and the end portion may vary from 1 mm to 1000 cm.

Bucket 266 of end bracket 267, in combination with bucket 277 of end bracket 276, define a length of an article confinement region. In the embodiment of FIGS. 2a-2c, the length of the article confinement region is adjustable. The length of the article confinement region is adjustable by sliding the base portion 212 of end bracket 267 relative to base portion 215 of the opposite end bracket 276. Similar to the embodiment of FIGS. 1a and 1b, siderails 201 and 202 define a width of the article confinement region.

Figure 3A:
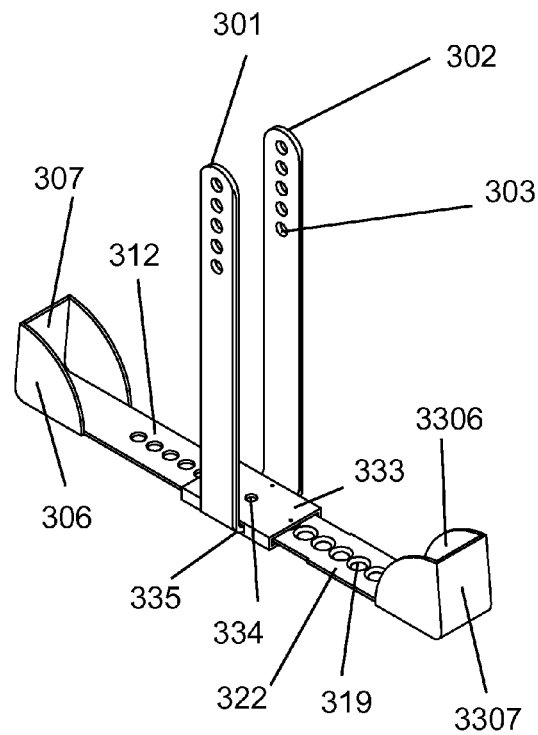
FIG. 3a is a perspective view of an embodiment with siderails and end brackets bound by a coupling member.

The combination of siderails, end brackets and a coupling member may be used to secure an article (not shown in this view), as in FIG. 3a. FIG. 3a depicts an embodiment wherein the siderails 301 and 302 are fashioned in the shape of an 'L' and contain one or more siderail lock holes 303 which may accommodate a locking mechanism. A locking mechanism may include but not be limited to a padlock or single shaft lock such as a trailer lock. The presence of a locking mechanism maintains the location of the rigid article between the siderails and the end brackets (torque inhibition rails). In some embodiments, one or more holes 319 in the base portion of an end bracket may be aligned with one or more holes 334 and/or a locking mechanism within the coupling member 333; locking mechanisms may include but are not limited to: latches, ratchets, springs, or locks 338c. In an embodiment, alignment of holes 319 with a locking mechanism 338c may serve to secure the end brackets in a desired position for article security. Siderail 301 may enter the coupling member through opening 335. In one embodiment, end bracket base portion holes 319 may align with coupling member hole 334 to allow passage of a fastener; such a fastener may bind the coupling member and bind siderails and end brackets to a mechanical anchor and/or a floor or other structure. Such fasteners may include but are not limited to bolts, mechanical anchors, wood screws, nails, and rivets. Mechanical anchors may include but are not limited to the interference fit types, thread forming types, and expansion types. In some embodiments, adjustable end brackets comprise end portions 307 and 3307 and gussets 306 and 3306 and end bracket base portion segments 312 and 322 which enter opposite each other into the coupling member 333. In some embodiments, depending upon the size and/or presence of a locking mechanism within coupling member 333, siderails and/or end bracket base portions may pass over or under portions of other siderails or end brackets. In some embodiments, end bracket base portions may measure 3 mm thick, 250 mm along the (major) long axis and 50 mm width in the minor axis (perpendicular to the major axis); buckets may measure 56 mm wide with an end portion measuring 75 mm. In some embodiments, the end portion of the end bracket comprises a substantially verticalized portion. In some embodiments: the thickness of the end brackets may vary from 0.1 mm to 10 cm thick; the (major) long axis may vary from 1 mm to 2000 cm; the width in the minor axis (perpendicular to the major axis) may vary from 1 mm to 1000 cm; buckets may vary from 1 mm to 1000 cm wide; and the end portion may vary from 1 mm to 1000 cm.

Figure 3B:
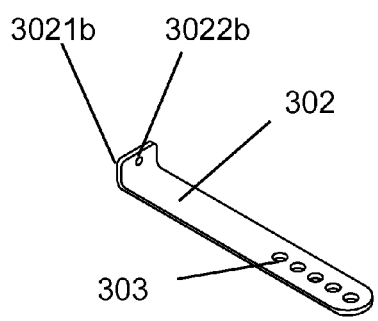

FIG. 3b depicts an embodiment wherein siderails may be in the shape of an 'L'. In some embodiments, the siderail may include a geometric formation on at least one ends so as to inhibit movement of the siderail. In the embodiment shown in FIG. 3b, the geometric formation comprises a bent portion 3021b. For example, in some embodiments the geometric formation may prevent the siderail from being removed from the device or passed through a portion of a component of the device. In some embodiments, siderails are bent portion 3021b, such that the siderails form an 'L' shape. In an embodiment, within the bent portion of the 'L' 3021b are located in one or more holes 3022b. Siderails may be comprised of metal, mineral, carbon, plastic or organic chemical materials; metals may include but not be limited to spring steel and alloys; minerals may include but not be limited to basalt fiber. In one embodiment, the siderails measure 5 mm thick, 350 mm along the major axis, 40 mm on the minor axis (perpendicular to the major axis), and have an L-segment measuring 25×40 mm. In some embodiments, the thickness of a siderail may vary from 0.1 mm to 10 cm; the (major) long axis may vary from 1 mm to 2000 cm; the width in the minor axis (perpendicular to the major axis) may vary from 1 mm to 1000 cm.

Figure 3C:
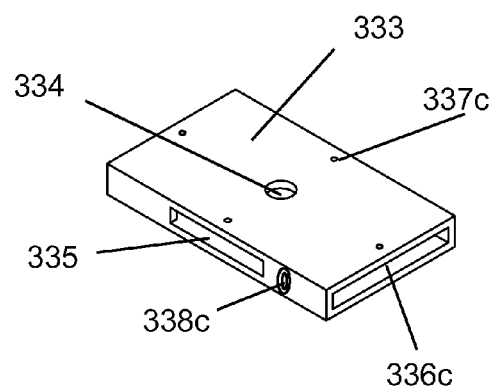

FIG. 3c depicts an embodiment of a coupling member 333 that may unite the siderails and/or end brackets. In some embodiments, siderails enter the coupling member 333 through opening 335 and a contralateral opening (not shown in FIG. 3c); end bracket base portions may enter the coupling member though opening 336c and a contralateral opening (not shown in FIG. 3c). In some embodiments, siderails and/or end brackets may be releasably attached in the coupling member 333. In other embodiments, holes, such as 337c allow access via instruments and/or probes to release one or more locking mechanisms. In other embodiments, lock 338c may allow for release of one or more siderails and/or end bracket base portions. Coupling members may be comprised of metal, mineral, carbon, plastic or organic chemical materials; metals may include but not be limited to spring steel and alloys; minerals may include but not be limited to basalt fiber. In one embodiment, coupling members measure 12 mm thick, 100 mm along the major axis, 60 mm on the minor axis (perpendicular to the major axis), and have a central hole measuring 13 mm diameter. In some embodiments the height of a coupling member may vary from 1 mm to 10 cm; the (major) long axis may vary from 1 mm to 2000 cm; the width in the minor axis (perpendicular to the major axis) may vary from 1 mm to 1000 cm.

Figure 4:
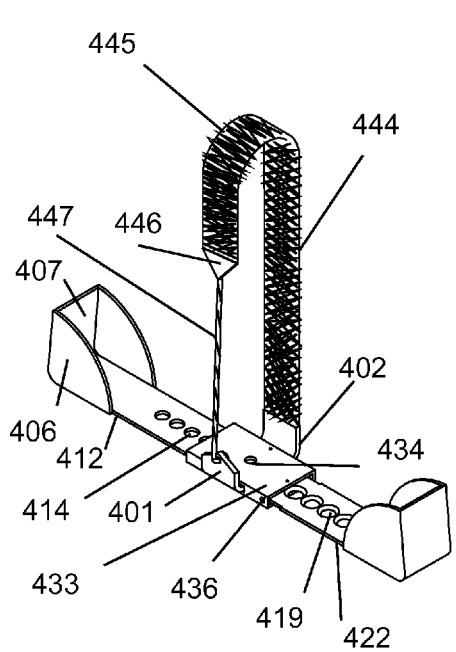
FIG. 4 is a perspective view of an embodiment with siderails comprised of cable and/or mesh and end brackets bound by the coupling member previously shown in FIG. 3c.

FIG. 4 depicts an embodiment wherein the siderail portions 401 and 402 are configured to be received in the coupling mechanism 433, which may contain a locking mechanism 436; locking mechanisms may include but are not limited to: latches, ratchets, springs, or locks. In some embodiments, one or more holes 419 in the base portion of an end bracket may be aligned with one or more holes 434 and/or internal locking mechanisms within the coupling member 433. In an embodiment, alignment of holes 414 and/or 419 with a locking mechanism 436 may serve to secure the end brackets in a desired position for article security. In an embodiment, a band and/or mesh 444 may attach directly to coupling member 433 and/or into a siderail portion 402. Mesh 444 may be flexible so as to create an arc 445 to fit the contained article. In some embodiments, the band/mesh 444 may be adjustable in length. In some such embodiments, access to the adjustability actuator may be inhibited once the article has been secured within the device. In other embodiments, bands/meshes 444 of varying sizes/length may be provided to accommodate a variety of different articles. In some embodiments, the band/mesh may be comprised of metal or mineral or carbon or an organic chemical. In some embodiments, the band and/or mesh is 4 em wide, 5 mm thick and 750 mm long. In some embodiments, the mesh/band is the entire structure providing motion restriction in a vertical direction. In some embodiments, band/mesh may be combined with cable 447 at junction 446; cable 447 may terminate at siderail portion 401 which, in turn, may be locked into coupling member 433. In some embodiments, cable 447 may attach directly into coupling member 433. In some embodiments, cable 447 may be the entire structure providing motion restriction in a vertical direction. In other words, in some embodiments, cable 447 may be provided in place of band/mesh 444. In one embodiment, base portion holes 419 may align with coupling member hole 434 to allow passage of a fastener. In some embodiments, motion in the horizontal plane is restricted by adjustable end brackets comprised of end portion 407 and gussets 406 bound to base portions 412 and 422 which enter opposite each other into the coupling member 433.

Figure 5A:
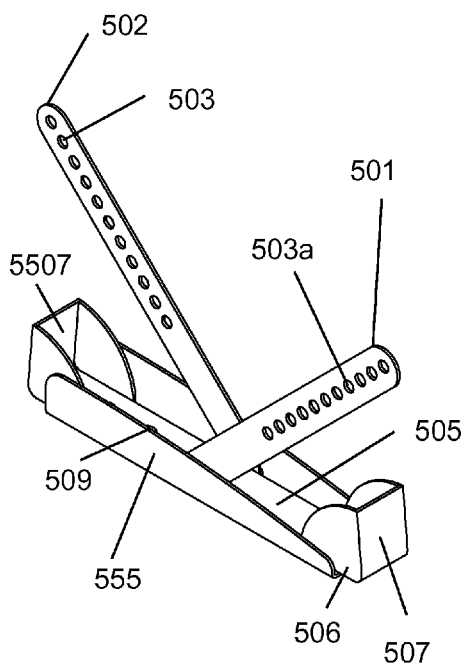
FIG. 5a is a perspective view of an embodiment of a security system with pivotable siderails and a basal adapter.
Figure 5B:
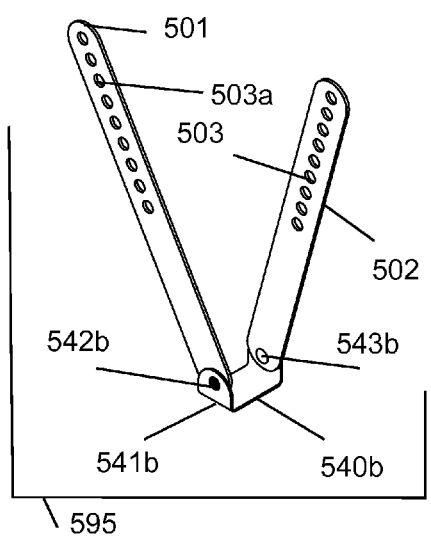

FIGS. 5a and 5b depict an embodiment of a basal adapter 555 and pivotable siderails 595, which comprises opposing siderail members 501 and 502 interconnected by a joining member 540b. In the embodiment shown in FIGS. 5a and 5b, the joining member 540b is a clevis. In some embodiments, one or both of the siderail members may be pivoted or otherwise reoriented with respect to the joining member. For example, in the embodiment depicted in FIG. 5b, fasteners 542b and 543b may be used to interconnect siderail members 502 and 501 and the joining member 540b. Fastener 542b could comprise countersunk, high tensile steel pressed fasteners. The joining member may be bent at location 541b, which allows passage of the joining member and siderails through siderail slots 559c in the basal adapter 555. In some embodiments, the siderail members may be connected to the joining member using alternative joining devices or structures including but limited to a ratcheting device, friction fit, spring, bracket, hinge, clamp, or tongue-in-groove mechanism. In FIG. 5a, siderails 501 and 502 are fashioned as straight linear pieces and contain one or more siderail lock holes 503 and 503a which may accommodate a locking mechanism. In one embodiment, base portion hole 509 (partially shown in the perspective view of FIG. 5a) may align with basal adapter hole 560c to allow passage of a fastener; such a fastener may bind the joining member and bind siderails and end brackets to a mechanical anchor and/or a floor or other structure. Such fasteners may include but are not limited to bolts, mechanical anchors, wood screws, nails, and rivets. Mechanical anchors may include but are not limited to the interference fit types, thread forming types, and expansion types. In some embodiments, adjustable end brackets may be used in conjunction with a basal adapter and/or pivotable siderail. The basal adapter shown in FIG. 5a could incorporate an end bracket similar to the one shown in FIG. 2b, but some embodiments may have a longer end bracket base portion and/or more openings and/or holes to receive fasteners such that a wider variety of article sizes may be accommodated. FIGS. 5a and 5b depict an embodiment having an indirect connection between the siderails and end brackets. In some embodiments, unitary end brackets comprised of end portions 507 and 5507 and gussets 506 and base portion segment 505 may be used, which may measure 3 mm thick, 370 mm along the (major) long axis and 50 mm wide in the minor axis (perpendicular to the major axis); buckets may measure 56 mm wide with an end portion measuring 75 mm. In some embodiments, the thickness of the end brackets may vary from 0.1 mm to 10 cm thick; the (major) long axis may vary from 1 mm to 2000 cm; the width in the minor axis (perpendicular to the major axis) may vary from 1 mm to 1000 cm; buckets may vary from 1 mm to 1000 cm wide; and the end portion may vary from 1 mm to 1000 cm. In some embodiments, the end portion of the end bracket comprises a substantially verticalized portion. In one embodiment, the siderails measure 5 mm thick, 350 mm along the major axis, 40 mm on the minor axis (perpendicular to the major axis) and have a hole located such that fastener 543b may pass. Siderail lock holes may measure 12 mm in diameter. In some embodiments, the thickness of a siderail may vary from 0.1 mm to 10 cm thick; the (major) long axis may vary from 1 mm to 2000 cm; the width in the minor axis (perpendicular to the major axis) may vary from 1 mm to 1000 cm.

Figure 5C:
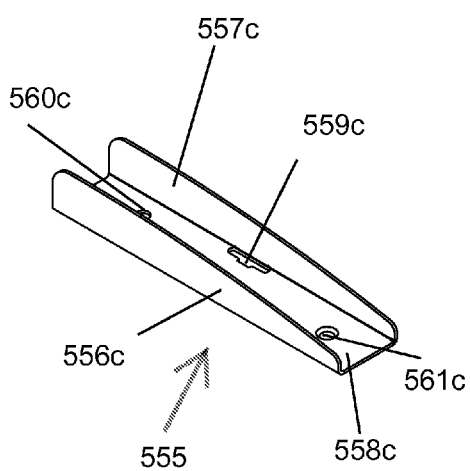
FIG. 5c is a perspective view of a basal adapter configured for various embodiments of security devices disclosed herein.

FIG. 5c is a perspective view of the basal adapter 555 depicted in FIG. 5a. In some embodiments, the basal adapter is comprised of sidewalls 556c and 557c and of bottom 558c. Sidewalls 556c and 557c may be integral with bottom 558c or alternatively, they may be detachably or pivotably coupled with bottom 558c. In an embodiment, siderail slots 559c in the basal adapter 555 may allow for the passage of siderails, such as the siderails from a pivotable siderail 595 into position on the base. The basal adapter siderail slot is configured to receive an L-shaped siderail to prevent the siderail from being removed from the siderail slot in the basal adapter once the base fastener has been deployed; the two basal adapter siderail slots are each configured to inhibit the respective siderail members from being removed from the basal adapter once a base fastener and locking mechanism have been deployed. In one embodiment, basal adapter hole 560c may align with end bracket base portion hole 509 (partially shown in the perspective view of FIG. 5a) to allow passage of a fastener. In some embodiments, such a fastener may bind end brackets and/or the joining member and/or siderails to a mechanical anchor and/or a floor or other structure. Such fasteners may include but are not limited to bolts, mechanical anchors, wood screws, nails, and rivets. Mechanical anchors may include but are not limited to the interference fit types, thread forming types, and expansion types. In some embodiments, one or more holes in the bottom of the basal adapter may be positioned to allow for fasteners to be placed closer to the end of the device to allow for placement of the device in cramped or uniquely shaped locations. In an embodiment, basal adapter hole 561c may allow for passage of a fastener therethrough. In some embodiments, a fastener need not pass through an overlying end bracket base portion. In some embodiments, the base portion of the end bracket is flat and configured to be slidably adjustable relative to the base portion of another end bracket. In some embodiments, the base portion of the end bracket is flat and configured to be slidably adjustable relative to a basal adapter, for example the basal adapter shown in FIG. 5c. In some embodiments, basal adapters may measure 3 mm thick, 350 mm along the (major) long axis and 72 mm width in the minor axis (perpendicular to the major axis); the height of the sidewalls may measure between 20 mm and 50 mm. In some embodiments, the thickness of the basal adapter may vary from 0.1 mm to 10 cm thick; the (major) long axis may vary from 1 mm to 2000 cm; the width in the minor axis (perpendicular to the major axis) may vary from 1 mm to 1000 cm; holes in the basal adapter may vary from 1 mm to 10 cm wide.

Figure 6A:
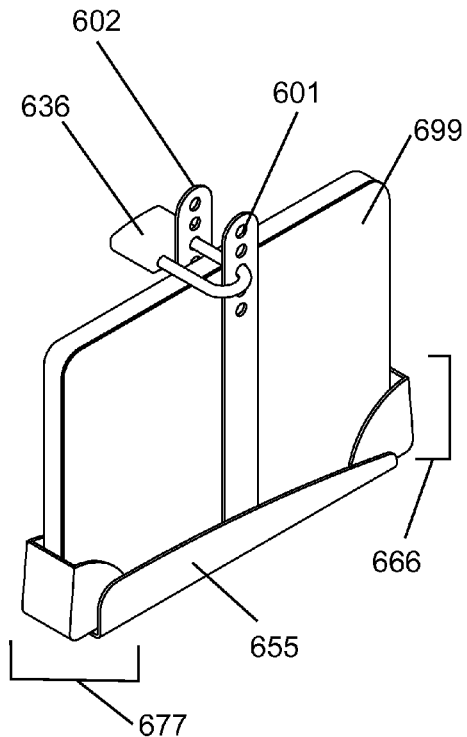
FIG. 6a is a perspective view of an embodiment with a laptop bound by 'L' shaped siderails and end brackets with a basal adapter.

FIG. 6a depicts an embodiment comprising separate siderails 601 and 602 and end brackets used in conjunction with a basal adapter 655 and lock 636 to secure an article, wherein the end brackets comprise buckets and a base portion. In this embodiment, bucket 677, and its opposing bucket 666, may be used in conjunction with a basal adapter 655 and lock 636 to secure an article. In some embodiments, the end portion of the end bracket comprises a substantially verticalized portion. One or more siderail lock holes in the siderails 601 and 602 may receive a portion of a locking mechanism, which may comprise a padlock 636 or single shaft lock. In some embodiments, siderails 601 and 602 may be reversibly connected to the base via siderail slots 559c in the basal adapter. In some embodiments, one or more additional siderail slots similar to 559c (already shown) may be provided for additional siderails or for adjusting the position of the siderails relative to the basal adapter. The presence of a locking mechanism 636 maintains the location of the rigid article between the siderails and the end brackets (torque inhibition rails). Locking mechanisms for all embodiments described herein may include but not be limited to padlocks, trailer locks, cable locks and single pin locks. One or more holes 629c in the base portion of the end bracket may be aligned with the holes 660c in the basal adapter 655 and/or the siderails and/or a hole in an opposing end bracket to allow passage of a fastener such as a high tensile bolt; other such fasteners may include but not be limited to wood screws, bolts, including countersunk types and nails.

Figure 6B:
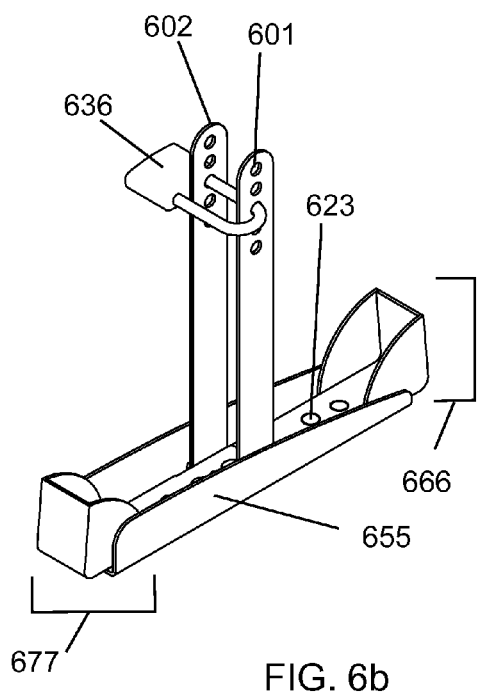
FIG. 6b is a perspective view of the embodiment of in FIG. 6a shown without an article in place.
Figure 6C:
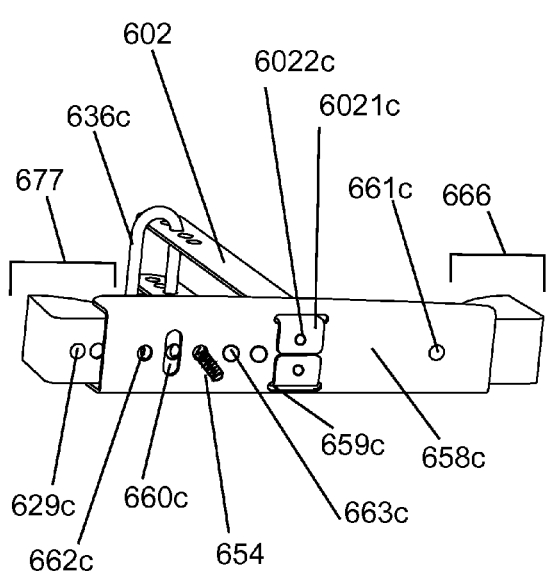
FIG. 6c is a bottom perspective view of the embodiment of FIGS. 6a and 6b showing the bent portions of the 'L' shaped siderails pointed inward and end brackets with the basal adapter depicted in FIG. 6b.

FIG. 6b is a perspective view of the embodiment shown in FIG. 6a wherein the combination of removable siderails 601 and 602 and bucket 666 of an end bracket and its opposing member (containing bucket 677) may be used in conjunction with a basal adapter 655 and lock 636 to secure an article (not present in this view). One or more siderail lock holes in the siderails 601 and 602 may receive a portion of a locking mechanism which may include a padlock 636 or single shaft lock. In some embodiments, siderails 601 and 602 may be reversibly connected to the base via siderail slots 659c in the basal adapter. The basal adapter shown in FIG. 6b could incorporate the end bracket similar to the one shown in FIG. 2b but some embodiments may have a longer end bracket base portion and/or more openings or holes 623 to receive fasteners such that a wider variety of article sizes may be accommodated. In one embodiment, the basal adapter 655 may be shaped like a 'U' on cross section. In some embodiments, one or more holes along the length of the basal adapter 660c or 662c or 663c may allow for passage of one or more fasteners to secure the base and remainder of the unit to one or more of the other adapters and/or structures described herein. The basal adapter shown in FIG. 6a could incorporate an end bracket similar to the one shown in FIG. 2b, but some embodiments may have a longer end bracket base portion and/or more openings to receive fasteners such that a wider variety of article sizes may be accommodated. In some embodiments, end brackets comprise a base portion as described in greater detail above with reference to FIGS. 2b and 2c. In some embodiments, end brackets comprise an end portion. In some embodiments, end brackets comprise gussets. In some embodiments, end brackets comprise gussets and an end portion. In some embodiments, end brackets comprise gussets and a base portion. In some embodiments, end brackets comprise an end portion and a base portion. In some embodiments, end brackets comprise gussets and an end portion and a base portion. In some embodiments, end brackets may be configured to preclude a would-be-thief from twisting an article. In some embodiments, end brackets may be configured to prevent a would-be-thief from sliding the laptop out of the device. In some embodiments, end brackets prevent a would-be-thief from twisting an article to allow it to pass by the end portion of the end brackets. In some embodiments, end brackets may inhibit access to a hard drive. In some embodiments, end brackets, in the presence of an article, may inhibit access to a fastener. FIGS. 6a-6c depict an embodiment having an indirect connection between the siderails and end brackets.

FIG. 6c is a bottom perspective view of the system depicted in FIG. 6a, wherein, in one embodiment, the combination of removable siderails 602 and end brackets may be used in conjunction with a basal adapter 658c and lock 636c to secure an article. In this embodiment, the end brackets comprise buckets 677 and 666 and a basal portion. In some embodiments, siderails 601 and 602 may be reversibly connected to the basal adapter via siderail slots 659c in the base. In some embodiments, one or more slots similar to 659c (already shown) may be made in the bottom 658c or sides of the basal adapter to allow at least partial passage and/or restrict further passage of a siderail. The presence of a locking mechanism 636c, such as a padlock, maintains the location of the rigid article between the siderails and the end brackets (torque inhibition rails). One or more holes 629c in the base portion of an end bracket may be aligned with holes, such as 660c, or 662c, or 663c in the bottom 658c of the basal adapter to allow passage of a fastener 654 such as a bolt; in some embodiments, other such fasteners may include but not be limited to bolts, screws, wood screws, mechanical anchors, rivets, nails, countersunk fasteners, pins, and hooks. Base adapter hole 661c may allow for the passage of a fastener with or without passage through the hole of a base portion of the end bracket. Mechanical anchors may include but are not limited to the interference fit types, thread forming types, and expansion types. In some embodiments, one or more openings and/or holes 660c or 662c or 663c along the length of the basal adapter and/or end bracket base portion may allow for passage of one or more fasteners to secure the base and remainder of the unit to one or more of the other adapters described herein. In some embodiments, the bent portion 6021c of 'L' shaped siderail 602 may have hole 6022c which may also allow for the passage of a fastener. The bent portion of L-shaped siderails may be deployed inwardly such that fastener removal via hole 6022c is impeded by the presence of the article when it is locked in place. In some embodiments the base portion of the end bracket is flat and configured to be slidably adjustable relative to the base portion of another end bracket. In some embodiments, the base portion of the end bracket is flat and configured to be slidably adjustable relative to a basal adapter, for example the basal adapter shown in FIG. 5c. The basal adapter shown in FIG. 6c could incorporate an end bracket similar to the one shown in FIG. 2b but some embodiments may have a longer end bracket base portion and/or more holes and/or openings to receive fasteners such that a wider variety of article sizes may be accommodated.

Figure 7:
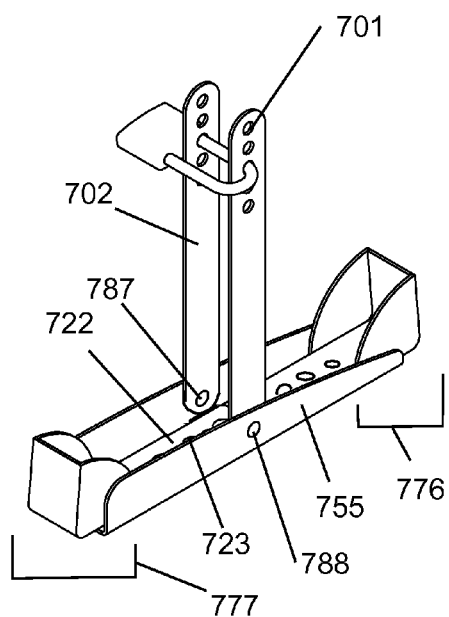
FIG. 7 is a perspective view of an embodiment of a security device comprising end brackets, a basal adapter and two siderails attached directly to the basal adapter.

FIG. 7 depicts an embodiment comprising siderails 701 and 702 that may be directly connected to a basal adapter 755 by siderail fasteners 787 and 788. In some embodiments siderail fasteners 787 and 788 may allow the siderails to move in a swinging fashion. Siderail fasteners may include but not be limited to rivets, snaps, hooks, and pins. In one embodiment, the combination of movable siderails and end brackets may be used in conjunction with a basal adapter 755 and lock to secure an article, wherein, the end brackets comprise buckets and a basal portion, wherein, bucket 777 and its opposing bucket 766 may be used in conjunction with a basal adapter 755 and lock to secure an article. Bucket 777 and its opposing member bucket 776 may be used in conjunction with a basal adapter 755 and a locking mechanism to secure an article. In some embodiments, one or more holes 723 (partially obscured by the viewing angle) in end bracket base portion 722 allow fastener passage and/or access into holes below in the basal adapter 755 when aligned. In some embodiments, the base portion of the end bracket is flat and configured to be slidably adjustable relative to the base portion of another end bracket. In some embodiments, the base portion of the end bracket is flat and configured to be slidably adjustable relative to a basal adapter, for example the basal adapter shown in FIG. 5c. The basal adapter shown in FIG. 7 could incorporate the end bracket similar to the one shown in FIG. 2b but some embodiments may have a longer end bracket base portion and/or more holes and/or openings to receive fasteners such that a wider variety of article sizes may be accommodated. Also, as an alternative embodiment to providing a joining member, the siderails may be welded and/or fused and/or otherwise connected to the basal adapter. Such connectors may include but not be limited to rivets, pins, hooks, and snaps. As an alternative embodiment, the siderails could be immobile and welded or directly fastened to the basal adapter. In other embodiments, the fusion may include but not be limited to a bonding agent or a fastener. In some embodiments, the siderails are fused to the bottom of the basal adapter and/or the sides of the basal adapter. FIG. 7 depicts an embodiment having an indirect connection between the siderails and end brackets.

Figure 8A:
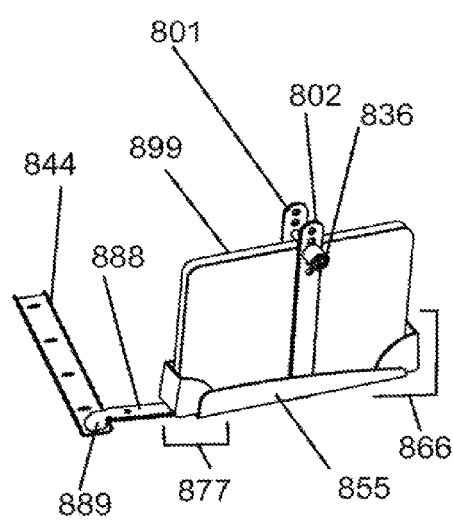
FIG. 8a is a perspective view of an embodiment of a security system or device including a vehicle adapter configured for use with various embodiments of security devices disclosed herein.

FIG. 8a depicts an embodiment comprising a vehicle adapter 888 and siderails 801 and 802 and end bracket, containing buckets 866 and 877 and/or a basal adapter 855 that may be used to secure and/or position an article 899, such as a laptop. The vehicle adapter may bind a basal adapter 855 and/or end brackets, such as that containing bucket 866, and/or siderails 801 and 802 to the seat rail 844 of a vehicle. In some embodiments, the point of fastener passage lies under flange 889b shown as point 889. In one embodiment, a vehicle adapter is comprised of one or more pieces of material configured to be approximated with each other in substantially parallel planes. In an embodiment, a vehicle adapter is comprised of a single piece that may be bent between 0 and 180 degrees. In an embodiment, a vehicle adapter may be comprised of a plurality of pieces with multiple bends. In some embodiments, the vehicle adapter may be comprised of a single piece or sheet of metal, mineral, carbon, plastic or organic chemical materials; metals may include but not be limited to spring steel and alloys; minerals may include but not be limited to basalt fiber. In one embodiment, the vehicle adapter measures 6 mm thick, 30 mm wide, 215 mm long. In some embodiments, the vehicle adapter may vary from 1 mm to 2000 mm in any of the aforementioned dimensions. One or more siderail lock holes in the siderails 801 may receive a portion of a locking mechanism 836 which may include but not be limited to a padlock or single shaft lock or a trailer lock. In some embodiments, one or more holes in a unitary vehicle adapter may be aligned with one or more holes in one or more siderails and/or one or more holes in one or more end brackets and/or one or more holes in a basal adapter. Said aligned holes may allow for passage of fasteners including but not limited to high tensile bolts, screws, bolts, pins, locks, snaps, catches or latches. The basal adapter shown in FIG. 8a could incorporate an end bracket similar to the one shown in FIG. 2b but some embodiments may have a longer end bracket base portion and/or more openings and/or holes to receive fasteners such that a wider variety of article sizes may be accommodated.

Figure 8B:
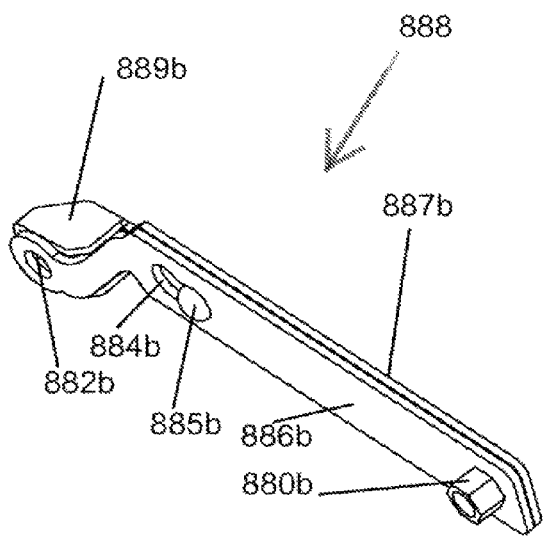
FIG. 8b is a perspective view of an embodiment of a vehicle adapter configured for use with various embodiments of security devices disclosed herein.
Figure 8C:
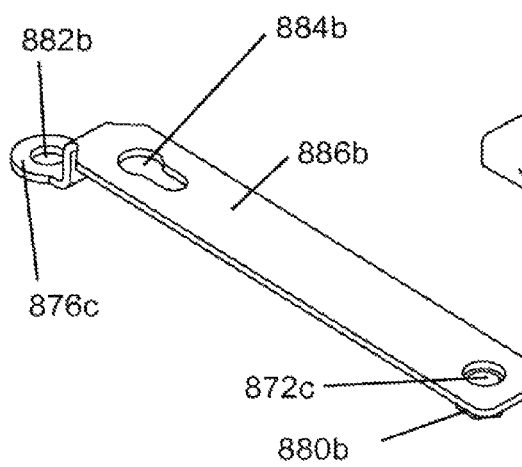
FIG. 8c is a perspective view of an embodiment of the bottom piece of a vehicle adapter.
Figure 8D:
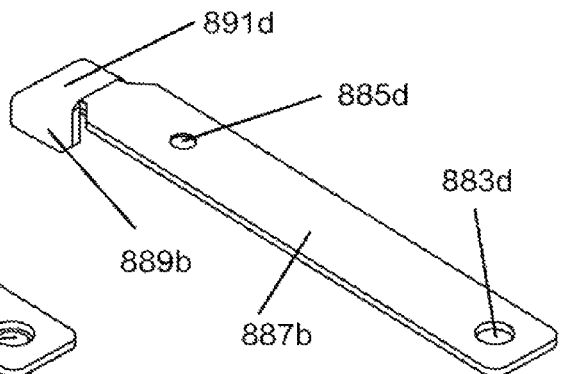
FIG. 8d is a perspective view of an embodiment of the upper piece of the vehicle adapter device shown in FIG. 8b.

FIG. 8b depicts an embodiment wherein an assembled vehicle adapter 888 may be comprised of two or more separate pieces 886b and 887b. In some embodiments, the vehicle adapter may bind an element of the security system to a fastener (placed into or previously existing in the vehicle). In the embodiment depicted in FIG. 8b, piece 887b comprises a cover piece. In some embodiments, the vehicle adapter components may pass over, under or through the siderails or end brackets and/or intermediary binding structures and/or basal adapters. In an embodiment, two or more pieces of metal may be welded to meet at an appropriate angle to facilitate placement of the device within a vehicle at a desired location and orientation; in some embodiments, the plurality of pieces may be pieced together so as to lie within substantially parallel planes. In some embodiments, the structure of one or more vehicle adapter pieces 887b may be modified by attaching fasteners 885b including but not limited to bolts, pins, flaps, wings, tongues of tongue-in-groove; such fasteners may be received by one or more pieces which have been modified to have a receiving site for such fasteners; receiving sites in one or more other pieces, such as bottom piece 886*b* may include but are not limited to keyholes 884*b* or threads or grooves or friction fits. In some embodiments, one or more of the pieces may be threaded or shaped to receive or allow passage of a fastener, including but not limited to a bolt, screw, pin, snap, lock or hook, that may bind the siderail and/or end bracket and/or basal adapter to the vehicle adapter. Such shapes in pieces may also include, but are not limited to, holes or slots or grooves. In some embodiments, a fastener, such as a nut 880*b*, may be attached to at least one piece, such as lower piece 886*b* of the vehicle adapter by methods including but not limited to welding or threading or screwing or gluing or friction fit; a fastener (such as those previously described in this patent), may pass through an adjacent hole 872*c* in a portion of the vehicle adapter 886*b* as depicted in FIGS. 8*c* and 8*d*. In some embodiments, one or more holes 883*d* in various pieces 887*b* allow further passage of a fastener to access other pieces. In some embodiments, the device is configured to allow passage of a fastener to bind the vehicle adapter 888 to a portion of the vehicle 844; such configurations may include but not be limited to rings 876*c* or holes 882*b*, such fasteners may include but not be limited to bolts, screws and pins. In some embodiments, vehicle adapters comprised of more than one piece may have one or more pieces and/or formations, such as flange 889*b* that may obstruct access to various fasteners that may be used to unite one or more parts of the vehicle adapter to various vehicular structures. Such vehicular structures may include and may not be limited to seat rails 844, floor boards, and pre-installed fasteners. In some embodiments, the structure of one or more pieces may be modified by folding or welding flange 889*b* and/or geometric braces to one or more pieces 887*b*. The presence of such flanges and/or gussets and/or geometric formations may reduce access to some portions of the adapter and may strengthen the adapter against prying. In some embodiments, formation 891*d* may instead comprise a cover to obstruct access to a fastener. In an embodiment, hole 885*d* allows access to fasten pin 885*b* into piece 887*b*. In some embodiments, the need for a nut, such as 880*b*, may be mitigated by threading holes in the adapter to receive bolts and/or by folding back one or more pieces of the adapter, and/or making a threaded hole in the folded portion. In some embodiments the need for a pin, such as 885*b*, and/or keyhole, may be mitigated by folding one or more tabs on pieces of the adapter, so as to have that piece of the adapter slide over and hold one or more other pieces of the adapter.

Figure 9A:
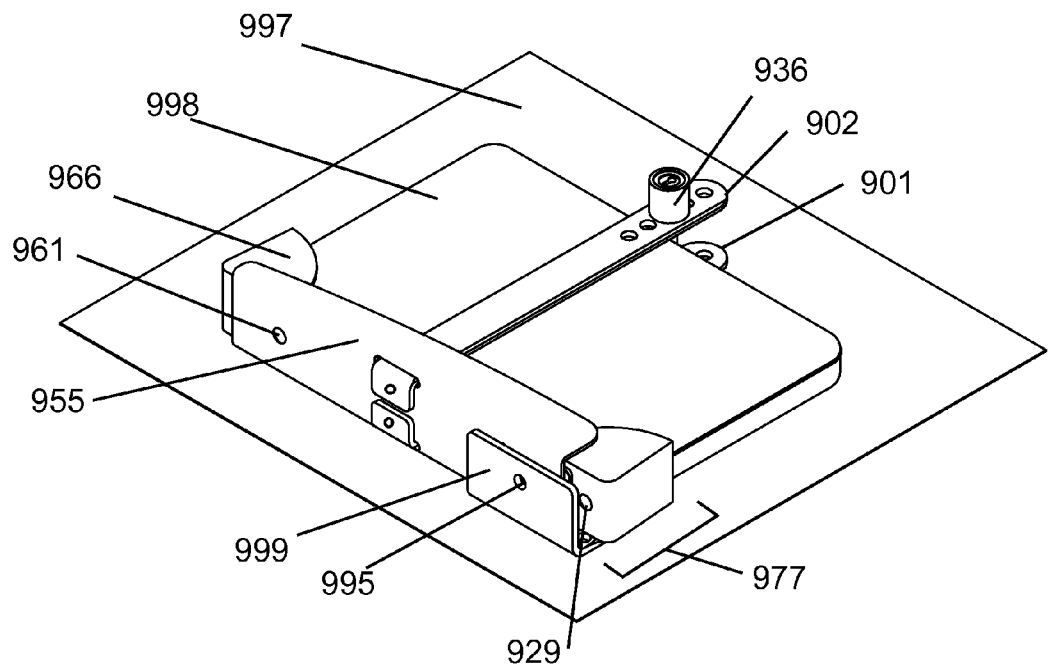
FIG. 9a is a perspective view of an embodiment of a security system or device including an angle adapter configured for use with various embodiments of security devices disclosed herein.

The combination of an angle adapter and siderails and end brackets and/or a basal adapter may be used to secure and/or position an article on a structure 997. FIG. 9*a* depicts a bottom perspective view of an embodiment comprising an angle adapter 999 and siderails 901 and 902 and end brackets and a basal adapter 955 which may be used to secure and/or position an article 998, such as a laptop to structure 997, wherein, the end brackets comprise buckets and a basal portion. In an embodiment, bucket 977 and its opposing bucket 966 may be used in conjunction with a basal adapter 955 and lock to secure an article 998. Base adapter hole 961 may allow for the passage of a fastener with or without fastener passage through the hole of a base portion of the end bracket. Structure 997 may comprise a floor, wall, furniture, desks, trees, living matter, wood, concrete slab, road material, cement, composite and the like. Structures may also include but not be limited to other adapters or devices or systems described herein. In an embodiment, the angle adapter 999 may be comprised of a unitary piece of material. In some embodiments, an angle adapter is comprised of one or more portions of material intersecting at an angle between 1 and 179 degrees. In some embodiments, the angle adapter is comprised of a single sheet of metal that is bent between 1 and 179 degrees to form the two legs. In some embodiments, that angle may be approximately 90 degrees. In some embodiments, the two legs may be separate pieces of material that are attached to one another. In an embodiment, the 'L' shaped siderails 901 and 902 may be pointed inward at the bent portions thereof. In some embodiments, one or more siderail slots in the bottom of basal adapter 955 allow at least partial passage and/or restrict further passage of a siderail. The presence of a locking mechanism 936, such as a padlock, maintains the location of a rigid article between the siderails and the end brackets (torque inhibition rails). In some embodiments, there may be one or more holes in the base portion of the end bracket that may be aligned with the holes (similar to hole 929) in the bottom of the basal adapter to allow passage of a fastener to secure the system to the angle adapter at one or more holes 995. Said aligned holes may allow for passage of a fastener, such as a high tensile bolt, screw, bolt, pin, lock, snap, catch or latch. Such fasteners may include but not be limited to wood screws or bolts including countersunk types and nails.

Figure 9B:
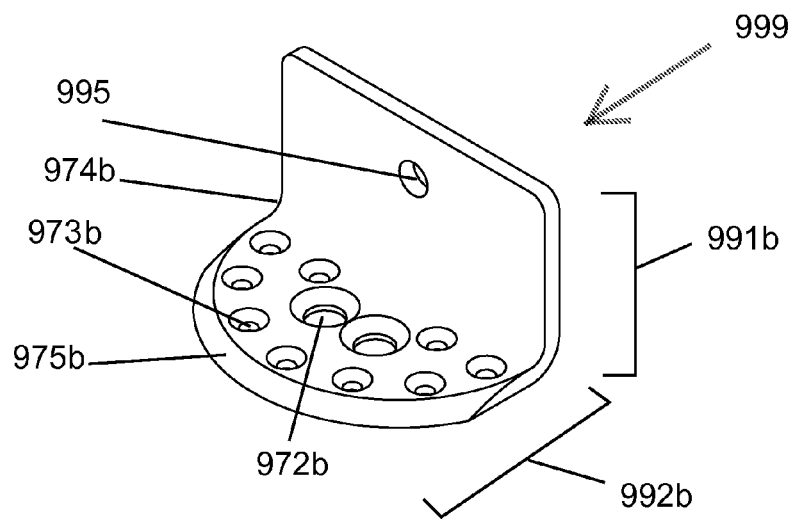

In some embodiments, the angle adapter may be folded or bent or pressed and/or welded to an angle substantially right angle and may have one or more holes on one or more pieces of the adapter. It is intended that a substantially right angle encompasses angles near to 90 degrees including the range of angles between 80 and 100 degrees. FIG. 9*b* depicts an embodiment with a substantial right angle bend 974*b* dividing a unitary angle adapter 999 into the article fixation portion 991*b* and the surface fixation portion 992*b*. In an embodiment, one or more of the holes in the article portion 995 may be tapered or threaded or formed to allow the passage or fixation of a fastener that may pass through end brackets and/or a basal adapter and/or siderails; such fasteners may include but are not limited to a screw, bolt, pin, lock, snap, catch or latch. In some embodiments, pieces of metal may be fused or otherwise connected forming an L-shape in cross section. In some embodiments, the surface portion of the angle adapter may have one or more holes such as 972*b* and 973*b* for fasteners to fasten the angle adapter to a surface. Such fasteners may include but are not to be limited to screws, bolts, nails, toggles, or rivets. In an embodiment, the angle adapter 999 may be rounded at the edges for aesthetic and safety considerations. In an embodiment, the angle adapter may be beveled on one or more edges 975*b*. The angle adapter may be comprised of metal, mineral, carbon, plastic or organic chemical materials; metals may include but not be limited to spring steel and alloys; minerals may include but not be limited to basalt fiber. In one embodiment, the angle adapter measures 6 mm thick, 115 mm wide, 75 mm long on one plane of the 'L' and measures 6 mm thick, 115 mm wide, 65 mm long on another plane. In some embodiments, the angle adapter may vary from 1 mm to 2000 mm in any of the aforementioned dimensions.

Figure 10A:
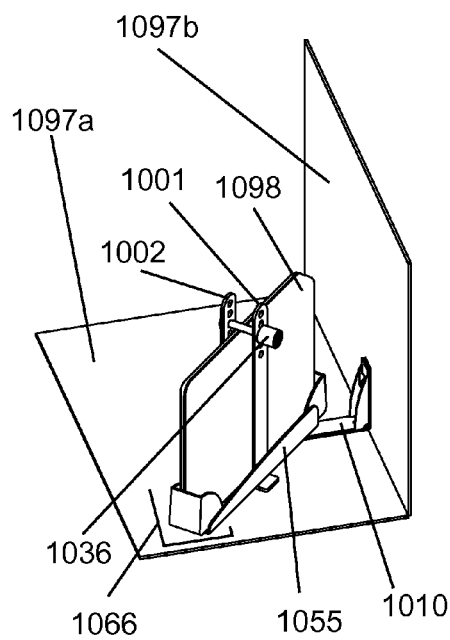
FIG. 10a is a perspective view of one embodiment of a security system or device including an angle adapter configured for use with various embodiments of security devices disclosed herein.

FIG. 10*a* depicts an embodiment comprising an angle adapter 1010 and siderails 1001 and 1002 and end brackets and a basal adapter 1055. The embodiment depicted in FIG. 10*a* may be used to secure and/or position an article 1098 such as a laptop. One or more siderail lock holes in the siderails 1001 may receive a portion of a locking mechanism 1036, which may include but not be limited to a padlock or single shaft lock or a trailer lock. In an embodiment, the end brackets comprise buckets and a basal portion. In an embodiment, bucket 1066, and its opposing bucket, may be used in conjunction with a basal adapter 1055 and lock to secure an article. The angle adapter may bind a basal adapter 1055 and/or end brackets, and/or siderails to a structure. In FIG.

10a, 1097a is the floor and 1097b is the wall. In alternative embodiments, the angle adapter 1010 may be used such that 1097a comprises an alternative of such things including but not limited to walls, floor boards, posts, furniture parts, trees, desks, rocks, or manufactured structures (including vehicles), and 1097b may comprise an alternative of such things including but not limited to walls, floor boards, posts, furniture parts, trees, desks, rocks, or manufactured structures (including vehicles). In some embodiments, the angle adapter may bind an element of the security system to a fastener placed into or on a previously existing structure 1097b. In some embodiments, the structure 1097b has a substantially vertical component. In an embodiment, an angle adapter may be comprised of a plurality of pieces that may be bent between 1 and 179 degrees. In an embodiment, an angle adapter may be comprised of a plurality of pieces with multiple bends. In some embodiments, the angle adapter may be comprised of more than one piece or sheet of metal, mineral, carbon, plastic or organic chemical materials; metals may include but not be limited to spring steel and alloys; minerals may include but not be limited to basalt fiber. In one embodiment, both pieces of angle adapter measure 3 mm thick, 40 mm wide, 150 mm long on one plane of the 'L' and measures 3 mm thick, 40 mm wide, 120 mm long on another plane. In some embodiments, the angle adapter may vary from 1 mm to 2000 mm in any of the aforementioned dimensions.

Figure 10B:
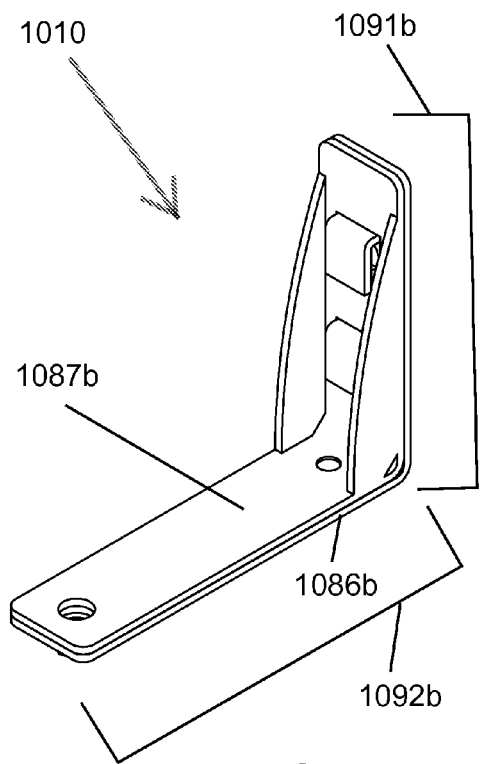

FIG. 10b depicts an embodiment of an assembled angle adapter 1010 comprising two or more separate pieces 1086b and 1087b. In the embodiment depicted in FIG. 10b wherein the adapter is mounted to a vertical structure, the substantially vertical portions 1091b and the substantially horizontal portions 1092b may fit into an angle formed by structures 1097a and 1097b. In the embodiment depicted in FIG. 10b, piece 1087b comprises a cover piece. In some embodiments, the angle adapter components may pass over, under or through the siderails or end brackets and/or intermediary binding structures and/or basal adapters. In an embodiment, two or more pieces of metal may be welded to meet at an appropriate angle to facilitate placement of the device at a desired location and orientation; in some embodiments, a plurality of pieces may be pieced together so as to lie within one or more substantially parallel planes. In some embodiments, the structure of one or more angle adapter pieces 1087b may be modified by attaching fasteners (not seen at these viewing angles but fastened to piece 1087b on the opposite side of hole 1085d, but similar to part 885b in FIG. 8b) including but not limited to bolts, pins, flaps, wings, or tongues of tongue-in-groove; such fasteners may be received by one or more pieces which have been modified to have a receiving site for such fasteners; receiving sites in one or more other pieces, such as bottom piece 1086b, may include but are not limited to keyholes 1084c or threads or grooves or friction fits.

Figure 10C:
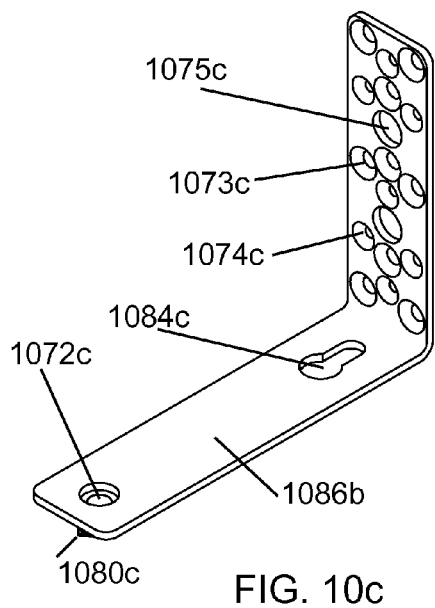
FIG. 10c is a perspective view of the bottom piece of the angle adapter shown in FIG. 10b.

FIG. 10c is a perspective view of an embodiment of the bottom piece of the angle adapter shown in FIG. 10b.

Figure 10D:
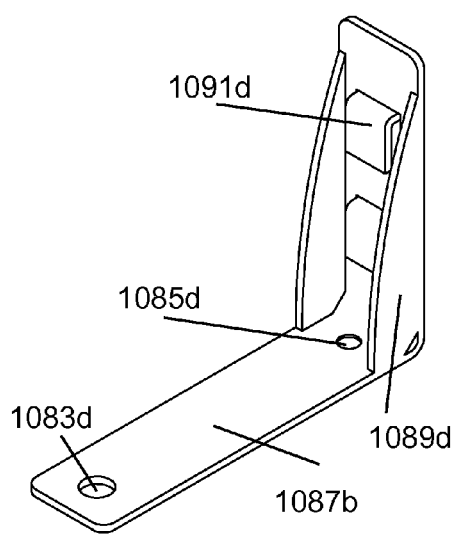
FIG. 10d is a perspective view of the upper piece of the angle adapter shown in FIG. 10b.

FIG. 10d is a perspective view of an embodiment of the upper piece of the angle adapter shown in FIG. 10b. In some embodiments, one or more of the pieces may be threaded or shaped to receive or allow passage of a fastener, including but not limited to a bolt, screw, pin, snap, lock or hook, that may bind the siderail and/or end bracket and/or basal adapter to the angle adapter. Such shapes may also include but are not limited to holes or slots or grooves. In some embodiments, a fastener, such as a nut 1080c, may be attached to at least one piece, such as lower piece 1086b of the angle adapter by methods including but not limited to welding or threading or screwing or gluing or friction fit; a fastener (such as those previously described in this patent), may pass through an adjacent hole 1072c in a portion of the angle adapter 1086b as depicted in FIGS. 10c and 10d. In some embodiments, one or more pieces 1087b are configured with one or more holes 1083d to allow further passage of a fastener therethrough so to reach other components of the system. In some embodiments, the device is configured to allow passage of one or more fasteners to bind the angle adapter 1010 to a portion of structure 1097a and/or 1097b; such configurations may include but not be limited to openings and/or holes such as 1073c, 1074c and 1075c; such fasteners may include but not be limited to bolts, screws, and pins. In some embodiments, angle adapters comprised of more than one piece may have one or more pieces and/or formations such as gussets 1089d that may obstruct access to various fasteners that may be used to unite one or more parts of the angle adapter to structures. In some embodiments, the structure of one or more pieces may be modified by folding or welding gussets 1089d or geometric braces to one or more pieces 1087b. The presence of such gussets and/or flanges and/or geometric formations may reduce access to some portions of the adapter and may strengthen the adapter against prying. In some embodiments, cover 1091d may impede access to a fastener. In some embodiments, the need for a nut, such as 1080c, may be mitigated by threading holes in the adapter to receive bolts and/or by folding back one or more pieces of the adapter, and/or making a threaded hole in the folded portion. In some embodiments, the need for a pin, and its attendant keyhole 1084c, may be mitigated by folding one or more tabs on pieces of the adapter, so as to have that piece of the adapter slide over and hold one or more other pieces of the adapter.

FIG. 11a depicts an embodiment comprising a component protection adapter 1111 and siderails 1101 and 1102 and end brackets and a basal adapter 1155 that may be used to secure and/or position an electronic article 1198, such as a laptop. One or more siderail lock holes in the siderails 1101 and 1102 may receive a portion of a locking mechanism 1136, which may include but should not be limited to a padlock or single shaft lock or a trailer lock, wherein the end brackets comprise buckets and a basal portion. Wherein, bucket 1177 and its opposing bucket 1166 may be used in conjunction with a basal adapter 1155 and lock to secure an electronic article. The combination of siderails and end brackets may be used to secure an electronic article which, in combination with a component protection adapter, may obstruct all or a portion of the electronic article. In one embodiment, a component protection adapter is a unitary plate of material comprised of flanges 1112 and 1114 which are substantially perpendicular to the component protection adapter plate 1115. In some embodiments, one or more plates or flanges may reduce access to at least a portion of the electronic article 1198. In an embodiment, the component protection adapter may be comprised of one plate and one flange. In an embodiment, the component protection adapter may be comprised of one plate and two flanges. In an embodiment, the component protection adapter may be comprised of one plate and three flanges. In an embodiment, the component protection adapter may be comprised of one or more plates and/or one or more flanges. In some embodiments, one or more of the plates and/or flanges may have a curvature. In some embodiments, the siderail may include a geometric formation on at least one end so as to inhibit movement of the component protection adapter. For example, in some embodiments, the geometric formation may prevent the component protection adapter from being removed from the device or passed through a portion of a component of the device. In an embodiment, one or more folds are made in a plate of material resulting in one or more flanges 1112 and 1114. The presence of the secured electronic article reduces flange movement and thus component protection adapter movement, which, in turn, obstructs various portions of an electronic article such as a laptop and laptop hard drive bay. The component protection adapter may be comprised of metal, mineral, carbon, plastic or organic chemical materials; metals may include but not be limited to spring steel and alloys; minerals may include but not be limited to basalt fiber. In one embodiment, the plate measures 3 mm thick, 240 mm tall, 260 mm long with flanges measuring 220 mm×45 mm and 200 mm×45 mm. However, in some embodiments any of these measurements may vary from 1 mm to 4000 mm.

In an embodiment as shown in FIG. 12, a component protection adapter may be configured in a single plane and may optionally include a portion with one or more openings that are configured to be aligned with one or more siderail lock holes in the siderails to allow for passage of a locking mechanism therethrough. In an embodiment, the component protection adapter comprises a single plate, as a unitary plate 1212 of material which is substantially planar and may obstruct all or a portion of the electronic article. The combination of siderails and end brackets and/or basal adapter may be used to secure an electronic article which, in combination with a component protection adapter 1212, may obstruct all or a portion of the electronic article. In one embodiment, the unitary plate single plate component protection adapter has holes 1214 toward the top portion 1213 of the device that may allow a lock to pass therethrough; said lock may pass through one or more siderails thus reducing the possibility of removal. The presence of the secured single plate component protection adapter and electronic article reduces component protection adapter movement, which, in turn, may obstruct access to various portions of an electronic article such as a laptop and laptop hard drive bay. The single plate planar component protection adapter may be comprised of metal, mineral, carbon, plastic or organic chemical materials; metals may include but not be limited to spring steel and alloys; minerals may include but not be limited to basalt fiber. In one embodiment, the component protection adapter measures 3 mm thick, 365 mm tall, 380 mm long. The top portion of the component protection adapter may measure 60 mm×60 mm with holes measuring 12 in diameter. However, in some embodiments any of these measurements may vary from 1 mm to 4000 mm.

FIG. 13*a* depicts an embodiment comprising a siderail lock hole insert adapter 1313, siderails 1301 and 1302 and locking mechanism 1336. Some embodiments may also include end brackets and/or a basal adapter as previously described. One or more lock holes 1303 in the siderails 1301 may receive a portion of a locking mechanism 1136 which may include but not be limited to a padlock or single shaft lock or a trailer lock and the shafts 1337 or shackles thereof. Spring 1320 may aid in positioning a portion of the locking mechanism. The combination of siderails and a lock hole insert adapter may be used to align portions of the locking mechanism. FIG. 13*b* depicts an embodiment wherein a unitary piece of material comprises a central cylinder 1314 and an article side ring 1315 and an outer side ring 1316. In some embodiments, one or more openings 1318 may be made in a portion of the lock hole insert adapter to allow passage of a spring member. In some embodiments, the spring member may connect a portion of the lock hole insert adapter with a portion of the cap 1338 of the shaft 1337 of locking mechanism 1336. The spring member may be made of materials including but not limited to metal and/or plastic and/or an organic chemicals. In some embodiments, the cylinder and/or the article side ring and/or the outer side ring may have a discontinuous portion yielding space 1317 in the lock hole insert adapter. In some embodiments, the cylinder and/or the article side ring and/or the outer side ring may be continuous with no spaces. In some embodiments, the lock hole insert adapter may include a non-rounded geometric formation with projections or snaps to secure the insert about the siderail lock hole. Spring 1320 may be configured to bias a portion of the locking mechanism toward or away from one or more side rail holes 1303. For example, in FIG. 13*a*, spring 1320 is configured to bias cap 1338 toward side rail hole 1303 such that shaft 1337 remains properly oriented with respect to the siderails while the locking mechanism 1336 is engaged by the user. The lock hole insert adapter may be comprised of metal, mineral, carbon, plastic or organic chemical materials; metals may include but not be limited to spring steel and alloys; minerals may include but not be limited to basalt fiber. In one embodiment, the thickness of the hole insert adapter is 3 mm; the central cylinder measures 12 mm, outer diameter; the article side ring measures 20 mm outer diameter; the outer side ring measures 16 mm, outer diameter. However, in some embodiments any of these measurements may vary from 1 mm to 4000 mm.

FIG. 14 depicts a perspective view of a ground adapter 1414 that may be used to secure and/or position various embodiments of security devices disclosed herein. In an embodiment, the ground adapter 1414 may be comprised of a unitary, straight piece of material. In some embodiments, a ground adapter is comprised of one or more pieces of material intersecting at an angle between 1 and 179 degrees. In some embodiments, one or more openings in the top portion 1416 may be aligned with holes of an end bracket that may be aligned with one or more holes in a basal adapter to allow passage of one or more fasteners to secure a security device to the ground adapter at one or more holes 1418 in the head portion 1416 which is situated at the end of shaft 1415. Said aligned holes may allow for passage of a fastener including but not limited to high tensile bolts, rivets, screws, pins, locks, snaps, catches, latches, wood screws, or bolts, including countersunk types and nails. In some embodiments, the ground adapter may be folded or bent or pressed and/or welded to an angle between 1 and 179 degrees. In an embodiment, the ground adapter has a pointed tip 1417 and or a nearby rim. Said point may facilitate hammering into the ground. Said rim may inhibit removal from the ground. Surfaces that the ground adapter may be fastened to include but are not limited to types of soil, rock, wet cement or earth. The ground adapter may be comprised of metal, mineral, carbon, plastic or organic chemical materials. In one embodiment, the ground adapter measurements include: 20 mm shaft width, 800 mm shaft length, and a top portion of 70 mm in greatest diameter. In some embodiments, the ground adapter may vary from 1 mm to 2000 mm in any of the aforementioned dimensions.

FIG. 15*a* depicts an embodiment comprising an auxiliary security container adapter 1515 and siderails 1501 and 1502, locking mechanism 1536, end bracket containing bucket 1566 and end bracket containing bucket 1577 and a basal adapter 1555. One or more siderail lock holes 1503 in the siderails 1501 may receive a portion of a locking mechanism 1536; locking mechanisms may include but not be limited to padlocks, single shaft locks, and/or trailer locks and the shafts or shackles thereof. In some embodiments, the auxiliary security container adapter may be used to store items. Such items may include but are not to be limited to motion sensors, GPS, electronic micro circuitry chips, vibration sensors, temperature sensors, electrical field sensor, magnetic sensor, sound sensors, light sensors, radiation sensors, chemical sensors, sensors of all kinds small enough to fit the auxiliary security adapter, and security devices including but not limited to alarms, flashing lights, lasers, sirens, electric shock devices, smoke emitters, biochemical emitters, dye emitters, transmitters, and receivers. The auxiliary security container adapter may also be used for other objects small enough to fit the device including but not limited to monetary equivalents and computer peripheral devices.

FIG. 15b depicts an embodiment of an auxiliary security container adapter 1515 comprising a main container 1516, a reclosable opening 1517, a tab 1518 with opening 1519. In an embodiment, opening 1519 may allow a portion 1537 of locking mechanism 1536 therethrough to pass and secure the auxiliary security container adapter 1515 to the device. In some embodiments, the auxiliary security container adapter may be comprised of metal, mineral, carbon, plastic or organic chemical materials; metals may include but not be limited to spring steel and alloys; minerals may include but not be limited to basalt fiber. In one embodiment, the thickness of the auxiliary security container adapter is 3 mm; main container 1516 measures 60 mm by 50 mm by 15 mm, and tab 1518 measures 50 mm×30 mm and opening 1519 measures 14 mm. However in some embodiments, any of these measurements may vary from 1 mm to 4000 mm.

It will be obvious to those having skill in the art that many changes may be made to the details of the above-described embodiments without departing from the underlying principles of the invention. The scope of the present invention should, therefore, be determined only by the following claims.

The invention claimed is:

1. A system for securing an article, the system comprising:
a first end bracket comprising a base portion and an end portion, wherein the base portion extends at an angle relative to the end portion, and wherein the base portion comprises a plurality of fastener openings;
a second end bracket comprising a base portion and an end portion, wherein the base portion extends at an angle relative to the end portion, wherein the base portion comprises a fastener opening, and wherein the base portion of the second end bracket is positioned relative to the base portion of the first end bracket so as to align the fastener opening of the base portion of the second end bracket with one of the plurality of fastener openings of the base portion of the first end bracket;
a first siderail connected to at least one of the first and second end brackets and comprising a lock hole configured for receiving a portion of a locking mechanism therethrough, wherein the system is configured to confine the article within a structure at least partially defined by the first end bracket, the second end bracket, and the first siderail, wherein the end portion of the first end bracket comprises a bucket comprising opposing gussets, and wherein the end portion of the second end bracket comprises a second bucket comprising a second set of opposing gussets;
a basal adapter comprising a slot configured to receive the first siderail, wherein the basal adapter further comprises a fastener opening configured to be aligned with the fastener opening of the base portion of the second end bracket and one of the plurality of fastener openings of the base portion of the first end bracket to adjust the size of a space between the end portion of the first end bracket and the end portion of the second end bracket, and wherein the fastener opening of the basal adapter is further configured to receive a single fastener configured to both fix the size of the space between the end portion of the first end bracket and the end portion of the second end bracket and fix the system to an external structure; and
a second siderail comprising a lock hole configured for receiving a portion of a locking mechanism, and wherein the basal adapter comprises a second slot configured to receive the second siderail.

2. The system of claim 1, wherein the first siderail is directly connected to at least one of the first and second end brackets.

3. The system of claim 1, wherein the first siderail and the second siderail are both shaped to prevent complete passage of the first and second siderails respectively through the first and second slots in one direction.

4. The system of claim 3, wherein the first siderail and the second siderail are separate pieces, and wherein the first siderail and the second siderail are substantially L-shaped.

5. The system of claim 1, wherein the basal adapter comprises a bottom and two opposing sidewalls.

6. The system of claim 5, wherein the two opposing sidewalls are configured to respectively abut against the first siderail and the second siderail.

7. The system of claim 1, wherein the first siderail and the second siderail are separate pieces.

8. The system of claim 1, further comprising a joining member for coupling the first siderail and the second siderail.

9. The system of claim 8, wherein the joining member comprises a clevis.

10. The system of claim 8, wherein the joining member is configured to allow for the first and second siderails to pivot with respect to the joining member.

11. The system of claim 1, wherein the lock hole of the second siderail is aligned with the lock hole of the first siderail so as to receive a portion of the locking mechanism through the lock holes of the first siderail and the second siderail.

12. The system of claim 1, wherein the lock hole of the first siderail comprises a plurality of lock holes, wherein the lock hole of the second siderail comprises a plurality of lock holes, and wherein each of the plurality of siderail lock holes is aligned with a corresponding lock hole from the second siderail.

13. The system of claim 1, further comprising an angle adapter comprising a first piece comprising a first portion and a second portion, wherein the first portion extends at a substantially perpendicular angle relative to the second portion, wherein the first portion comprises a fastener opening, and wherein the fastener opening is configured to be aligned with a fastener opening of at least one of the first and second end brackets.

14. The system of claim 13, wherein the second portion of the first piece comprises a fastener opening, wherein the angle adapter further comprises a second piece comprising a first portion and a second portion, wherein the first portion of the second piece extends at a substantially perpendicular angle relative to the second portion of the second piece, wherein the angle with which the first portion of the first piece extends from the second portion of the first piece is substantially the same as the angle with which the first portion of the second piece extends from the second portion of the second piece, and wherein the second piece is configured to be placed over the first piece so as to block access to the fastener opening of the first piece.

15. The system of claim 14, wherein the second piece further comprises a fastener opening in the first portion of the second piece, and wherein the fastener opening of the second piece is positioned to be aligned with the fastener opening of the first piece once the second piece has been placed over the first piece.

16. The system of claim 1, further comprising a vehicle adapter comprising a first piece comprising:
   a first vehicle adapter portion;
   a bend; and
   a second vehicle adapter portion offset from the first vehicle adapter portion, wherein the first vehicle adapter portion comprises a vehicle adapter fastener opening configured to be aligned with at least one of the fastener opening of the first end bracket and the fastener opening of the second end bracket, and the second vehicle adapter portion comprises a second vehicle adapter fastener opening configured to be aligned with a fastener opening of a vehicle.

17. The system of claim 16, wherein the vehicle adapter further comprises:
   a second piece configured to be approximated with the first piece and comprising:
      a first portion comprising a fastener opening configured to be aligned with a fastener opening of the first portion of the first piece; and
      a second portion comprising a cover configured to impede access to the fastener opening of the second portion of the first piece once the second piece has been approximated with the first piece.

18. The system of claim 1, further comprising a component protection adapter comprising:
   a plate configured to be positioned adjacent to one side of the article;
   a first flange configured to be positioned adjacent to the base portion of at least one of the end brackets; and
   a second flange configured to be positioned adjacent to the end portion of one of the end brackets, wherein the plate, the first flange, and the second flange all extend in planes that are substantially perpendicular to one another, and wherein a portion of the plate is configured to be positioned in between the first siderail and the article.

* * * * *